(12) United States Patent
Anderson

(10) Patent No.: US 6,665,981 B1
(45) Date of Patent: Dec. 23, 2003

(54) AQUATIC PLANTING PROCESS AND RELATED PLANT HOLDERS

(76) Inventor: James F Anderson, 3941 24th St. SE., Ruskin, FL (US) 33570

( * ) Notice: Subject to any disclaimer, the term of this patent is extended or adjusted under 35 U.S.C. 154(b) by 9 days.

(21) Appl. No.: 09/871,416

(22) Filed: May 31, 2001

(51) Int. Cl.[7] .................................................. A01C 7/00
(52) U.S. Cl. .................................... 47/58.1 R; 405/24
(58) Field of Search ............................... 119/246, 253; 405/24, 27; 47/59 R, 58.1 R

(56) References Cited

U.S. PATENT DOCUMENTS

| | | | | |
|---|---|---|---|---|
| 2,660,039 A | * | 11/1953 | Newell | 215/377 |
| 3,142,934 A | * | 8/1964 | Mehling | 47/39 |
| 3,386,693 A | * | 6/1968 | Ring | 248/27.8 |
| 4,328,764 A | * | 5/1982 | Nickel | 119/239 |
| 4,434,743 A | * | 3/1984 | Nickel | 119/239 |
| 4,487,588 A | * | 12/1984 | Lewis, III et al. | |
| 5,338,131 A | | 8/1994 | Bestmann | |
| 6,056,476 A | * | 5/2000 | Streichenberger | 119/208 |
| 6,070,537 A | * | 6/2000 | Anderson et al. | 111/114 |

FOREIGN PATENT DOCUMENTS

| | | | |
|---|---|---|---|
| GB | 2176399 A | * | 12/1986 |
| JP | 8-228514 | * | 9/1996 |
| JP | 11-181738 | * | 7/1999 |
| JP | 11-323870 | * | 11/1999 |
| JP | 11-323938 | * | 11/1999 |

OTHER PUBLICATIONS

Heslinga, Gerald. 1999. Clams to Cash: How to make an sell giant clam shell products. Center for Tropical and Subtropical Aquaculture. Publication No. 125. p. 19.*

* cited by examiner

Primary Examiner—Peter M. Poon
Assistant Examiner—Jeffrey L. Gellner
(74) Attorney, Agent, or Firm—Donald R Bahr

(57) ABSTRACT

A process for planting aquatic plants underwater on the bottom and edges of estuary's where an aquatic plant which is ready for transplanting is positioned in a holder having a means for retaining the transplantable plant. The holder may be weighted with a bottom gripping section to secure the holder including the plant to the estuary bottom. The preformed holders may be positioned on the bottom of the estuary or broadcast on the surface. The preferred gripping sections are rocks, stones and mollusk shells. The holder also incorporates an organic button which retains the aquatic plant during the planting process.

33 Claims, 1 Drawing Sheet

AQUATIC PLANTING PROCESS AND RELATED PLANT HOLDERS

BACKGROUND

This invention is concerned with a process and related apparatus whereby aquatic plants may be planted underwater for purposes of restoration. The restoration of all aspects of the environment has become extremely important in recent years. The three areas of restoration which are of primary importance are reducing air pollution, restoring and cleaning up the land and cleaning up and restoring our waterways, the ocean and related estuaries. It is these related estuaries that are the primary thrust of the subject invention.

As a result of the decrease in water quality millions of acres of aquatic plant life, which form an important part of the aquatic eco system have been destroyed. That is because of a decrease in water quality, in other words pollution, aquatic plant life has been destroyed. In most cases this destruction has been gradual over a long period of years however in some instances it can be rapid for example as a result of a ship wreck.

Because aquatic plant life is an important part of the complex aquatic environment the restoration of this plant life is of primary importance.

The natural restoration of aquatic plant life is an extremely slow process. While it is possible to manually plant shoots of aquatic plants due to the cost of labor the manual planting of sea grass plants is at best been marginally successful. Due to the difficulty of manually planting shoots of aquatic plants the cost of manually planting just one acre of an estuary can cost many tens of thousands of dollars. Further manual planting in some instances is of questionable success as the person doing the planting in walking over the bottom of an estuary does further damage by crushing other plants which may be growing in the area.

This invention is concerned with a process and apparatus whereby sea grass can be quickly planted in an economical fashion.

As used in connection with this invention the term aquatic plant life and sea grass includes many species of plant life such as halodule wrightii (shoal grass), thalassia (turtle grass) etc.

Aquatic plant life as it exists in estuaries is important in preventing water pollution as this plant life acts as a filter for many pollutants and hence this plant life helps to maintain water quality.

The restoration of aquatic life to the bottom of our estuaries is extremely important as this aquatic plant life plays a critical function in the total marine eco system. A large number of important marine animals, both warm and cold blooded, rely totally or in part on this aquatic plant life for a breeding area, for cover, for food etc. for example the endangered manatee relies solely on sea grass as its food source.

OBJECTS

The primary object of this invention is a process whereby aquatic plant life may be positioned on and planted in the bottom and edges of an estuary.

Still another object is related apparatus whereby this planting may be effected with minimal damage to the bottom of the estuary.

Still another object of this invention is a process for growing aquatic plant life such that it is suitable for planting on the bottom of an estuary.

Another object is a holder for use in planting aquatic plants.

DESCRIPTIONS OF THE DRAWINGS

DESCRIPTION OF THE PREFERRED EMBODIMENT

The subject invention relates to a process for planting aquatic plants such as a wide variety of sea grasses. The invention is also concerned with a process for growing aquatic plants such that they are suitable for use with the process and apparatus of this invention.

The process of this invention in its broadest terms comprises the growing and positioning of a shoot of an aquatic plant in a holder which facilitates its planting underwater.

As is shown in U.S. Pat. No. 6,070,537 dated Jun. 6, 2000, this invention is concerned with a plurality of composite structures which may be manually positioned on an estuary bottom. Further these composite structures may be broadcast from a boat and allowed to settle to the bottom of the estuary. It is desirable to have the whole planting system formed from natural materials. A plurality of natural holders are illustrated in FIGS. 1–6.

Figure 1:
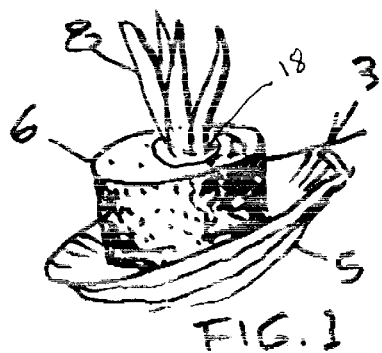
FIG. 1 and 2 are is a perspective views showing holders which utilize mollusk shells.
Figure 2:
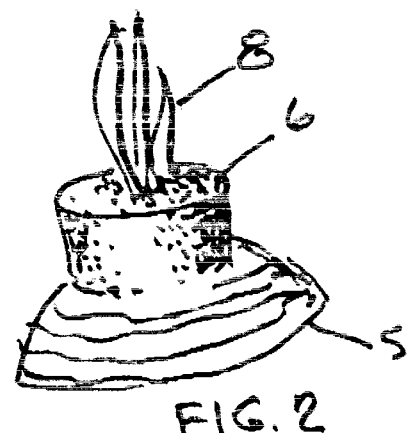

One embodiment of a natural holder 3 is illustrated in FIGS. 1 and 2.

In this structure the plant retaining section is a button 6 which is secured to a mollusk shell 5. Shell 5 is preferably one half of an oyster or clam shell. Aquatic plant shoot 8 protrudes from button 6. Button 6 may incorporate fertilizer which will aid the growth of plant shoot 8. Shell 5 forms the estuary bottom gripping section.

Since holder 3 is formed from a mollusk shell the composite system 3 is all natural and hence nothing foreign is introduced into or on the estuary bottom.

As is shown in FIG. 2 Button 6 may be secured to either side of mollusk shell 5. However it is preferred that button 6 be secured to the inside of mollusk shell 5 as is illustrated in FIG. 1.

Figure 6:
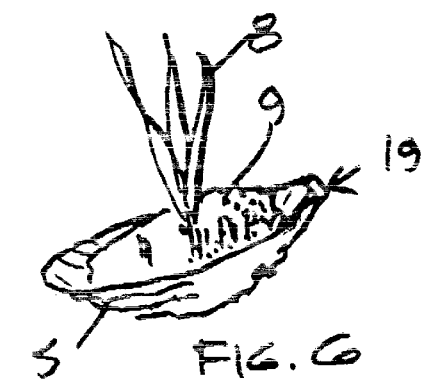
FIG. 6 is a perspective view of a holder wherein the plant is secured with a biomass.

In accordance with still another embodiment button 6, as a defined structure is eliminated and replaced with a biomass 9 as is shown in FIG. 6. Biomass 9 consist of a growing medium such a peat moss which is initially in a semi liquid paste form which incorporates an adhesive.

As is stated above in connection with button 6 biomass 9 may incorporate fertilizer and other plat nutrients.

Figure 3:
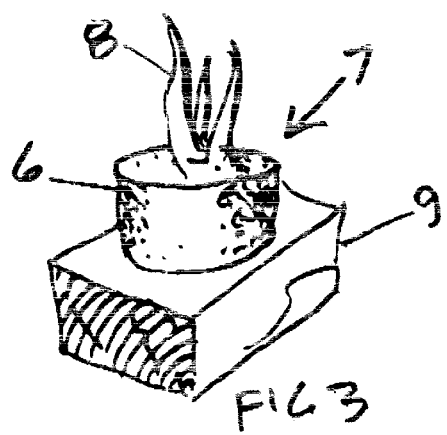
FIG. 3 is a perspective view showing a floatable holder.

FIG. 3 illustrates another embodiment of an aquatic plant holder for use in this invention wherein a button 6 is secured to a floatable base 9, a block of wood 9 being illustrated. The composite density of holder 7 is less than 1 therefore holder 7 will float. This ability to float is useful when it is desirable to plant plants in very shallow water as holder 7 can be broadcasted on to the water and allowed to drift into shallow water until it is grounded and graphs the estuary bottom. While a rectangular block of wood 9 is shown this base can assume other shapes such as disc shaped, tubular shaped or round shape.

Holder 7 is useful in planting plants at the water edge such as restoring mangroves wherein shoot 8 is a mangrove which is allowed to drift to the edge of the estuary where it can take root.

Figure 4:
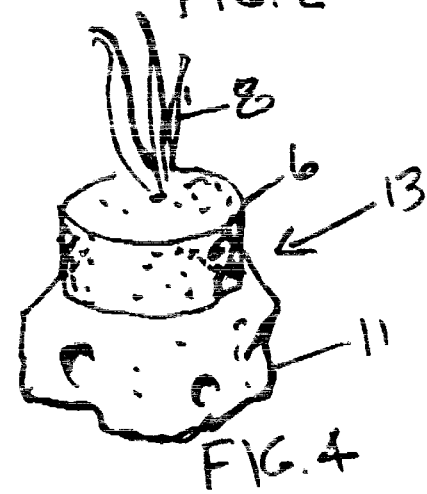
FIG. 4 is a perspective view of a holder which utilizes a stone.

FIG. 4 illustrates still another embodiment of an aquatic plant holder 13 wherein a button 6 is secured to a rock 11 which forms the estuary bottom gripping section.

Figure 5:
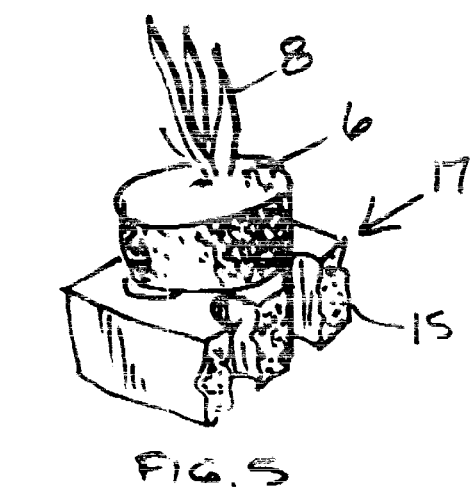
FIG. 5 is a perspective view of a holder which utilizes a brick section.

Still another embodiment of an aquatic plant holder 17 is shown in FIG. 5. In aquatic plant holder 17 a button 6 is secured to a section of brick 15. Brick section 15 can be designed to designate over a period of time by controlling the degree to which brick section 15 is fired. Brick section 15 comprises the estuary bottom gripping section.

Referring to FIG. 4 rock 11 can be any dense substance such as crushed aggregate, gravel, stones etc.

After the formation of aquatic plant holders 3,7,13, 17 and 19 aquatic plant 7 can be incubated in a nursery prior to the placement of the composite structures into the estuary.

The composite density of aquatic plant holders 3,13, 17 and 19 is greater than 1 due to the incorporation of dense estuary bottom gripping sections 5,11 and 15 into the holders. Because these densities are greater than 1 these aquatic plant holders will sink to the estuary bottom.

While specific bases 5,7,11 and 15 are shown in FIGS. 1–6, these estuary bottom gripping sections can also be formed from polymeric materials which are not harmful to the environment such as polymeric materials which are blended with materials such as starch. These blended polymeric materials can be engineered to decompose in a set period of time after being exposed to ultraviolet light or to an aqueous environment such as warm salt water.

Any suitable adhesive or mechanical means may be used to secure button 6 to a suitable base. An example of a suitable adhesive is an adhesive sold under the trademark 5200 by the 3M Corporation.

The plant gripping section button 6 can be formed from any material which is capable of holding plant 8 during the planting process. In the preferred embodiment button 6 is formed from an organic material such as compressed peat moss, compressed polystyrene beads, compressed manure, mixtures thereof etc. Button 6 incorporates an aperture 18 which is capable of retaining plant 8. Buttons being formed from compressed peat are the preferred embodiment for use with this invention as they are capable of holding plant 8 during incubation in a nursery and during planting.

Button 6 is used in this invention may be laced with fertilizer and trace minerals which aid in the growth and root formation of plant 8.

Button 6 when formed from compressed peat moss expands after it is exposed to an aqueous environment.

If incubated in a nursery once plant 8 has formed roots, the composite structure is planted in accordance with the process of this invention.

A seed could be substituted for plant 8 in button 6 or its equivalent wherein the seed would generate in button 6.

The above description and drawings are illustrative of modifications that can be made without departing from the present invention, the scope of which is to be limited only by the following claims.

What is claimed is:

1. A process for planting individual aquatic plants, or groups of aquatic plants underwater in an estuary having a bottom, which comprises the steps of:
   a. positioning an aquatic plant in a holder which has an aquatic plant retaining section and an estuary bottom gripping section, which are directly secured to each other,
   b. placing said aquatic plant holder in an estuary such that the estuary bottom gripping section is allowed to come into contact with the estuary bottom,
   c. wherein the density of the composite aquatic plant holder is greater than 1 gm/cc.

2. The process of claim 1 wherein the holder is manually placed in contact with the estuary bottom.

3. The process of claim 2 wherein the estuary gripping bottom section disintegrates in a predetermined period of time.

4. The process of claim 3 wherein the aquatic plant retaining section is formed from an organic medium which is conducive of aquatic plant growth.

5. The process of claim 4 wherein the estuary bottom gripping section is a mollusk shell.

6. The process of claim 3 wherein the estuary bottom gripping section is a mollusk shell.

7. The process of claim 2 wherein the aquatic plant retaining section is formed from an organic medium which is conductive of aquatic plant growth.

8. The process of claim 7 wherein the estuary bottom gripping section is a mollusk shell.

9. The process of claim 2, wherein the aquatic plant retaining section is formed from an organic medium which is conductive of aquatic plant growth.

10. The process of claim 9 wherein the estuary bottom gripping section is a mollusk shell.

11. The process of claim 2 wherein the estuary bottom gripping section is a mollusk shell.

12. The process of claim 1 wherein the holder is broadcast onto the estuary surface.

13. The process of claim 12 wherein the estuary gripping bottom section disintegrates in a predetermined period of time.

14. The process of claim 13 wherein the aquatic plant retaining section is formed from an organic medium which is conducive of aquatic plant growth.

15. The process of claim 14 wherein the estuary bottom gripping section is a mollusk shell.

16. The process of claim 13 wherein the estuary bottom gripping section is a mollusk shell.

17. The process of claim 12 wherein the aquatic plant retaining section is formed from an organic medium which is conductive of aquatic plant growth.

18. The process of claim 17 wherein the estuary bottom gripping section is a mollusk shell.

19. The process of claim 12 wherein the aquatic plant retaining section is formed from an organic medium which is conductive of aquatic plant growth.

20. The process of claim 19 wherein the estuary bottom gripping section is a mollusk shell.

21. The process of claim 12 wherein the estuary bottom gripping section is a mollusk shell.

22. The process of claim 1 wherein the estuary gripping bottom section disintegrates in a predetermined period of time.

23. The process of claim 22 wherein the aquatic plant retaining section is formed from an organic medium which is conductive of aquatic plant growth.

24. The process of claim 23 wherein the estuary bottom gripping section is a mollusk shell.

25. The process of claim 22 wherein the estuary bottom gripping section is a mollusk shell.

26. The process of claim 1 wherein the aquatic plant retaining section is formed from an organic medium which is conductive of aquatic plant growth.

27. The process of claim 26 wherein the aquatic plant retaining section is formed from an organic medium which is conductive of aquatic plant growth.

28. The process of claim 27 wherein the estuary bottom gripping section is a mollusk shell.

29. The process of claim 26 wherein the estuary bottom gripping section is a mollusk shell.

30. The process of claim 1, wherein the aquatic plant retaining section is formed from an organic medium which is conductive of aquatic plant growth.

31. The process of claim 30 wherein the estuary bottom gripping section is a mollusk shell.

32. The process of claim 1 wherein the estuary bottom gripping section is a mollusk shell.

33. The process of claim 1 wherein the estuary gripping section is a member selected from the group consisting of a piece of stone, a mollusk shell or a section of masonry.

* * * * *